United States Patent
Uhm et al.

Patent Number: 6,072,802
Date of Patent: Jun. 6, 2000

[54] INITIAL SYNCHRONIZATION METHOD IN CODE DIVISION MULTIPLE ACCESS RECEPTION SYSTEM

[75] Inventors: Oui-Suk Uhm; Dae-jung Kim; Kyung Park; Jin-woo Roh, all of Daejoen, Rep. of Korea

[73] Assignee: Dacom Corporation, Seoul, Rep. of Korea

[21] Appl. No.: 08/958,263

[22] Filed: Oct. 27, 1997

[30] Foreign Application Priority Data

Jul. 1, 1997 [KR] Rep. of Korea ............ 97-30478

[51] Int. Cl.[7] .............. H04B 7/216; H04J 4/00
[52] U.S. Cl. ........................... 370/441; 370/478
[58] Field of Search ............... 370/503–519, 370/350, 441, 478; 375/367, 208–210

[56] References Cited

U.S. PATENT DOCUMENTS

| | | | |
|---|---|---|---|
| 5,550,811 | 8/1996 | Kaku et al. | 370/515 |
| 5,638,362 | 6/1997 | Dohi et al. | 370/350 |
| 5,737,329 | 4/1998 | Horiguchi | 370/516 |
| 5,867,525 | 2/1999 | Giallorenzi et al. | 375/208 |

*Primary Examiner*—Chi H. Pham
*Assistant Examiner*—Brenda H. Pham
*Attorney, Agent, or Firm*—Darby & Darby

[57] ABSTRACT

An initial synchronization method in a code division multiple access reception system for determining a pseudonoise (PN) code received in the system by receiving a signal corresponding to an interval of the PN code in a window size, determining representative values of corresponding ones of PN code chips in the window, respectively, and determining the representative values as chips of the PN code, comprising the steps of selecting n successive PN code chips having the same offset in each interval of the PN code, deriving mn (m<n) phase differences of the successive PN code chips in each interval of the PN code, and continuously deriving subsequent PN code chips, thereby deriving n PN code chips, and deriving representative values of n chips of the PN code, based on corresponding ones of the PN code chips derived in all intervals of the PN code, respectively, thereby determining the PN code. In order to verify the initial synchronization, a first PN code signal derived in the above procedure is used. A second PN code signal is also used which is derived by shifting offsets p times in each interval of the PN code. For the verification, the second PN code signal is compared with a signal which is obtained by shifting, by p clocks, a seed derived from a generating polynomial of a PN code generator included in the system based on the first PN code signal.

10 Claims, 6 Drawing Sheets ary long PN code.
INITIAL SYNCHRONIZATION METHOD IN CODE DIVISION MULTIPLE ACCESS RECEPTION SYSTEM

BACKGROUND OF THE INVENTION

1. Field of the Invention

The present invention relates to a method of a rapid initial synchronization for pseudonoise (PN) codes in the receiver of a code division multiple access (CDMA) system. A plurality of PN codes and multiple symbol differential detection scheme are used to achieve an initial synchronization in mobile communication systems.

2. Description of the Prior Art

CDMA systems include a transmitter adapted to transmit a signal after spreading the band of the signal using a PN code and a receiver adapted to search a code pattern identical to the PN code of a signal received therein and to despread the band of the received signal, thereby recovering an original signal. In such CDMA systems, it is important to provide a timing between the PN produced in the receiver and the PN received in the receiver. This timing procedure is called a "synchronization procedure". Such a synchronization procedure is classified into an initial synchronization procedure, in which a coarse alignment at an interval of one chip is achieved, and a synchronization tracking procedure, in which a fine alignment at an interval of less than one chip is achieved. The present invention is associated with the initial synchronization procedure. Where an initial synchronization method according to the present invention is utilized, it is possible to achieve a rapid initial synchronization, as compared to conventional serial search methods.

Generally, an initial synchronization may be obtained, using one of three systems, namely, a serial search system, a sequential estimation system and a matched filter system. Commercial CDMA mobile communication systems mainly adopt the serial search system because it provides a simple hardware configuration and a superior performance even at a low signal-to-noise ratio, even though it requires a lot of time for the initial synchronization procedure. This system has a configuration shown in FIG. 1.

In the serial search system shown in FIG. 1, a received signal in a receiver is multiplied by a code pattern which is a reference signal generated from local PN code generator, for a window size corresponding to a search period. The above operation is done for the entire period of $2^n-1$ while shifting the reference signal by one clock and accumulating the result of every operation. Thereafter, a code pattern having a largest correlation value Vs is searched for from the accumulative values. Using this code pattern, a synchronization between the received signal and the reference signal is achieved. FIG. 2 illustrates a received PN code and a generated PN code in the receiver, where "k" and "k'" represent phase offsets of the received and locally generated PN codes, respectively. "M" represents a correlation length (window) between the two signals. When the phase offset k of the received PN code is identical to the phase offset k' of the locally generated PN code, the correlation value Vs between the two PN codes is maximized, i.e., an initial synchronization is acquired.

The correlation value Vs between the two PN codes is expressed as follows:

$$Vs=(S_k+n_k)\times S_{k'}+(S_{k+1}+n_{k+1})\times S_{k'+1}+ \ldots +(S_{k+M}+n_{k+M})\times S_{k'+M} \quad (1)$$

where, "$S_k, \ldots, S_{k+M}$", "$S_{k'}, \ldots, S_{k'+M}$", "$n_k, \ldots, n_{k+M}$" and "M" represent received PN codes, locally generated PN codes, Additive White Gaussian Noise and a window size respectively.

In the above-mentioned system, the acquisition time Tacq taken for an initial synchronization is expressed as follows:

$$Tacq=PN \text{ Code Length} \times \text{Window Size/PN Code Rate (Second)} \quad (2)$$

Where this equation is applied to IS-95 (Interim Standard-95) system commercially available as a CDMA digital mobile communication system, an acquisition time Tacq of about 1.7 to 3.4 seconds is taken for the initial synchronization because the system uses a PN code rate of 1.2288 Mcps (chip per second), a PN code interval of $2^{15}-1$ (32,767), and a window size of about 64 to 128.

Meanwhile, for future mobile communication systems, wideband CDMA techniques use a relatively long PN code. For instance, the IS-95 system uses a short PN code of $2^{15}-1$ whereas the wireless local loop (WLL) standard system adopted in Korea uses a long PN code of $2^{32}-1$. The WLL system of Interdigital Corporation (IDC) uses a longer PN code of $2^{36}-1$. Such a long PN code, however, is partially used in each base station. That is, each base station uses a portion of the long PN code corresponding to a certain interval of time. For example, the WLL system uses only a 20 ms portion of the long PN code of $2^{32}-1$. In the case of a system using a PN code rate of 8.192 Mcps (10 MHz), the code length used in each base station corresponds to 163,840 chips (8.192 Mcps×20 ms=163,840 chips). However, it is hard to know in advance information about which 20 ms portion of the long PN code of $2^{32}-1$ is used in any base station. As a result, in the case of serial search, there is a limitation in that all portions of the PN code should be searched for in order to obtain an initial synchronization of the PN code. A lengthened acquisition time for the initial synchronization, moreover, is required in the conventional serial search methods because a high PN code rate of about 10 Mcps is used. For example, even at a window size of 64, the following lengthened acquisition time for the initial synchronization is taken:

$$Tacq = \frac{(2^{32}-1)\times 64}{10 \text{ Mcps}} \approx 4\times 64 \times 109/107$$

$$\approx 400 \text{ Minutes(6 Hours and 40 Minutes)}$$

Consequently, it is hard to apply the serial search methods to practical systems in which a PN code acquisition should be achieved within a few seconds.

SUMMARY OF THE INVENTION

The object of this invention is to provide an initial synchronization method capable of achieving a rapid initial synchronization in a CDMA reception system.

In accordance with the present invention, an initial synchronization procedure is achieved without using a serial search system used in conventional systems. A certain segment of a long PN code sequence is repeatedly received for several intervals. Phase differences of combined codes in the segment of each interval are derived and accumulated. Based on the accumulated value, the received PN code is determined. In order to verify the result of the determination, the determined PN code is used as a first received code. A second received code is also derived by using a code shifted from the first received code by a desired distance. A seed is also derived, based on the first received code. The seed is input at a PN code generator. The seed is then shifted by a certain number of clocks, thereby obtaining data. This data is then compared with the second received code. When the data is identical to the second received code, it is determined that an accurate code is obtained.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
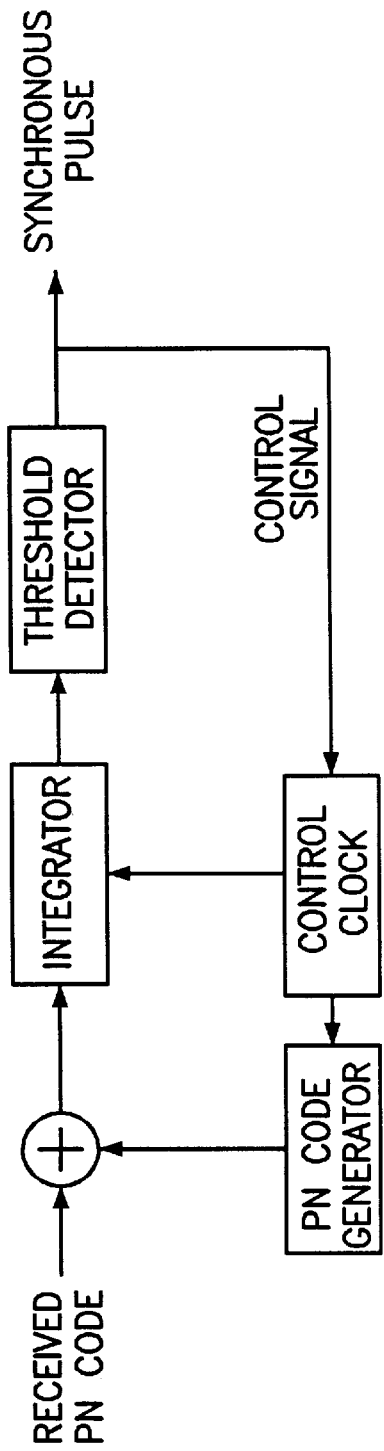
FIG. 1 is a block diagram illustrating a serial initial synchronization system.
Figure 2:
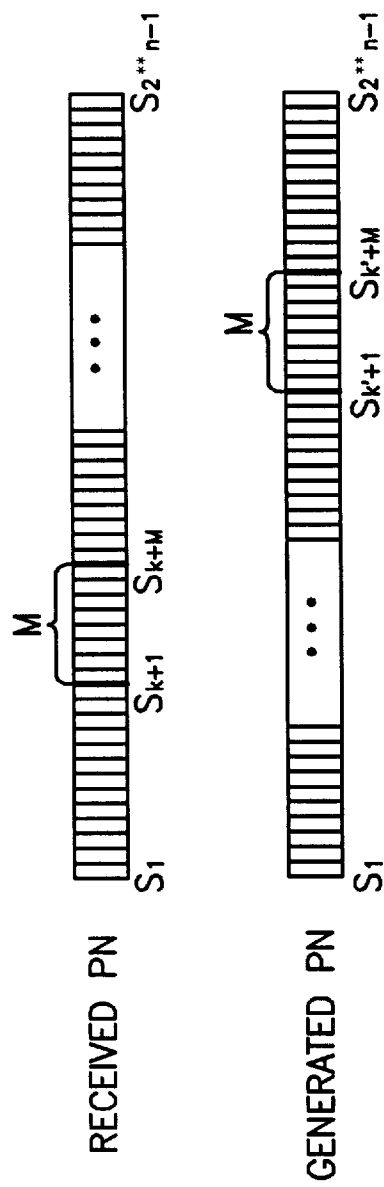
FIG. 2 is a diagram illustrating an initial synchronization procedure carried out in the serial initial synchronization system.
Figure 3:
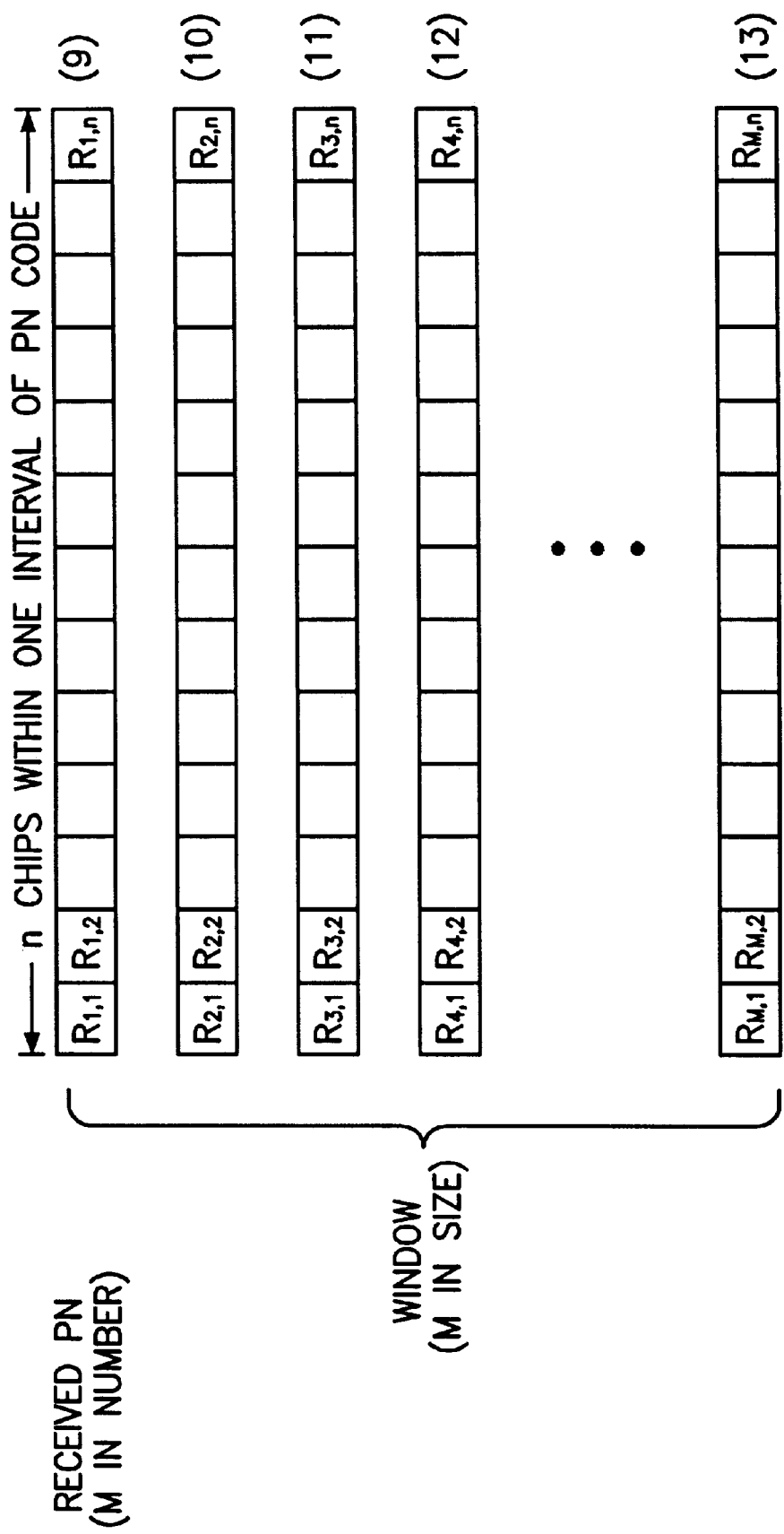
FIG. 3 is a diagram illustrating an initial synchronization method according to the present invention.

FIG. 3 is a diagram illustrating an initial synchronization method according to the present invention.

A PN code through a radio channel is received in the receiver in an amount of n chips within a PN code interval (for example, 20 ms in the case of a WLL system). This reception procedure is repeated M times corresponding to a window size. This reception procedure is carried out as shown in FIG. 3. Assuming that each chip of the received PN code has a value R (a complex number), this value can be expressed in the form of "Ri,j" as shown in FIG. 3. In other words, "Ri,j" represents the value of the j-th chip of a PN code received at the i-th interval. The received PN codes can be expressed by the following matrix:

$$\begin{matrix} R_{1,1} & R_{1,2} & R_{1,3} & R_{1,4} & , & , & , & R_{1,n} \\ R_{2,1} & R_{2,2} & R_{2,3} & R_{2,4} & , & , & , & R_{2,n} \\ \vdots & & & & & & & \\ R_{M,1} & R_{M,2} & R_{M,3} & R_{M,4} & , & , & , & R_{M,n} \end{matrix} \quad (M \times n \text{ Matrix})$$

Elements of each column in the above matrix consist of the same PN code chips repetitively received M times, respectively.

In accordance with the present invention, a phase difference of each row in the matrix is derived using a multiple symbol differential detection (MSDD) method, thereby deriving a signal indicative of a PN code chip. The derived PN code chips associated with each column of the matrix are divided by "M" to average them. In such a manner, n PN code chips are derived to determine a PN code. The determination of the PN code may also be achieved by deriving signals dominantly existing in one window, and determining those signals as chips of the PN code.

Now, the MSDD method utilized in accordance with the present invention will be described.

The MSDD method is a maximum likelihood symbol detection for multiple symbols (N symbols) which is a extended method of conventional Differential Phase Shift Keying (DPSK).

Accordingly, the MSDD method provides an improvement in performance as compared to conventional methods.

The present invention provides a method wherein the current symbol is compared with the just previous symbol to determine a phase difference therebetween, thereby determining the current symbol. Alternatively, the present invention provides an extended MSDD method. In accordance with the extended MSDD method, in order to determine multiple symbols (N-1 symbols), phase differences of all possible combinations of N symbols are derived. Using the derived phase differences, determination parameters are made to compare the associated and combined symbols. In this case, the number of possible phase difference combinations is "N(N-1)/2" whereas the number of possible determination parameters is "$2^n-1$".

The MSDD method will be described in more detail in conjunction with the examples wherein N is 2 and 3. It is assumed that "$R_{k-2}$", "$R_{k-1}$" and "Rk" are received signals.

Meanwhile, a phase difference between two complex numbers a and b are typically derived as follows:

$$Re(ab^*)=\tfrac{1}{2}(a^*b+ab^*)$$

where, "x" represents a complex conjugate for a complex number x, and "Re(x)" represents a real part of the complex number x.

In N=2 case, in order to determine "$R_k$", a phase difference between $R_k$ and $R_{k-1}$ is derived.

That is, if the value of "$Re(R_k R^*_{k-1})$" is more than zero, "$R_k$" and "$R_{k-1}$" have the same phase. On the other hand, if the value of "$Re(R_k R^*_{k-1})$" is less than zero, "Rk" and "$R_{k-1}$" have different phases.

Figure 4:
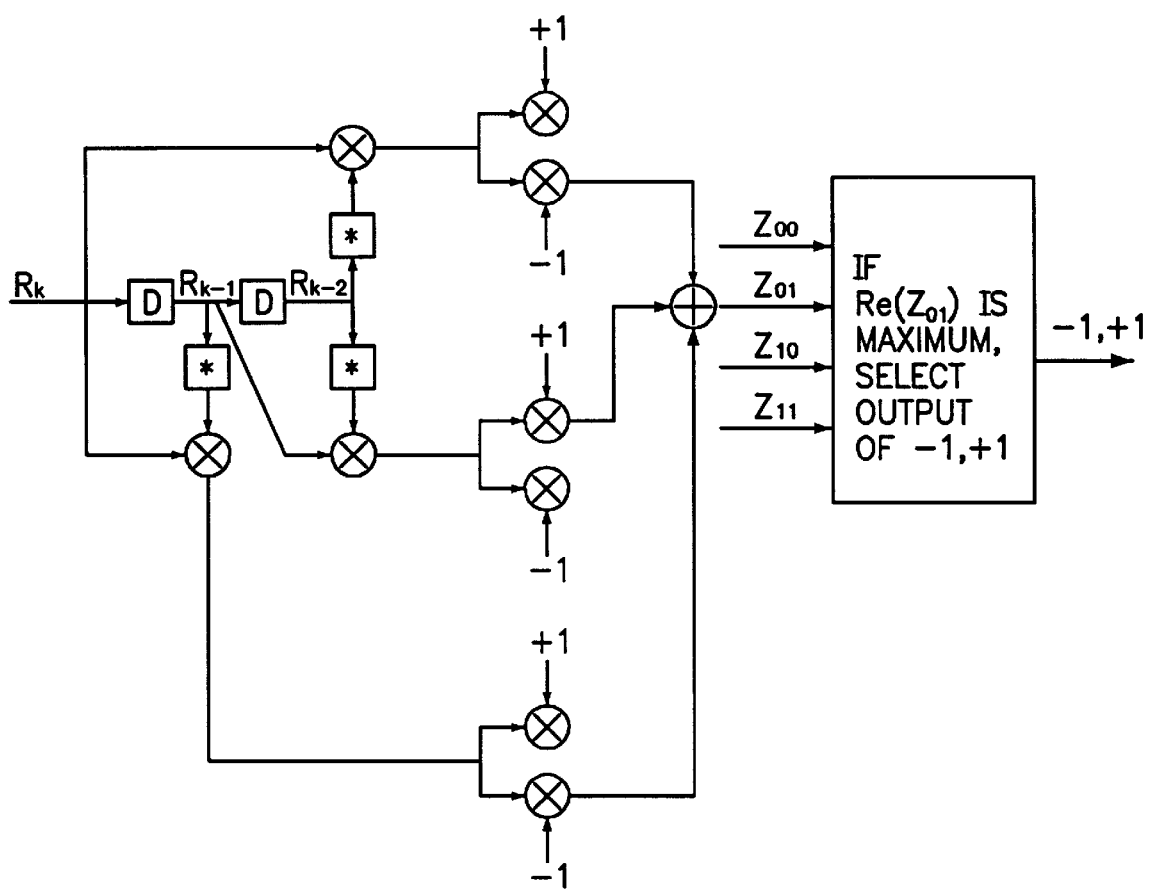
FIG. 4 is a diagram illustrating a multiple symbol differential detection (MSDD) method(N=3 case)

As mentioned above, the number of possible phase difference combinations produced in accordance with the MSDD method is N(N-1)/2. Since N is 3, three phase differences, namely, "$R_{k-1}R^*_{k-2}$", "$R_k R^*_{k-1}$" and "$R_k R^*_{k-2}$" are derived, as shown in FIG. 4. Using the three phase differences, the following four determination parameters $Z_{00}$, $Z_{01}$, $Z_{10}$ and $Z_{11}$ are made. After taking real parts of the determination parameters, two symbols are determined for the maximum one of the taken values.

TABLE

| $R_{k-1}R^*_{k-2}$ | $R_k R^*_{k-1}$ | $R_k R^*_{k-2}$ | $Z_{jm}$ |
|---|---|---|---|
| -1 | -1 | 1 | $Z_{00}$ |
| -1 | 1 | -1 | $Z_{01}$ |
| 1 | -1 | -1 | $Z_{10}$ |
| 1 | 1 | 1 | $Z_{11}$ |

One of the three phase differences depends on the remaining two phase differences. In the case illustrated in the above table, "$R_k R_{k-2}$" depends on "$R_{k1}R^*_{k-2}$" and "$R_k R^*_{k-1}$". Th will be described in more detail. Where "$R_{k-1}R^*_{k-2}$" and "$R_k R^*_{k-1}$" correspond to "1", respectively, namely, where there is no phas difference between "$R_{k-2}$" and "$R_{k-1}$" and between "$R_{k-1}$" and "$R_k$" there is no phase difference between "$R_{k-2}$" and "$R_k$". Accordingly "$R_k R_{k-2}$" corresponds to "1" ($R_k R^*_{k-2}$=1). On the other hand where one of "$R_{k-1}R_{k-2}$" and "$R_k R^*_{k-1}$" corresponds to "-1", namely where there is a phase difference in one of "$R_{k-1}R^*_{k-2}$" an "$R_k R^*_{k-1}$", "$R_{k-2}$" and "$R_k$" have different phases, respectively Accordingly, "$R_k R^*_{k-2}$" corresponds to "-1" ($R_k R^*_{k-2}$=-1). Where "$R_{k-1}R^*_{k-2}$" and "$R_k R^*_{k-1}$" correspond to "-1", respectively, namely where all of "$R_{k-2}$", "$R_{k-1}$" and "$R_k$" have different phases respectively, there is no phase difference between "$R_{k-2}$" and "$R_k$" In this case, accordingly, "$R_k R_{k-2}$" corresponds to "1" ($R_k R^*_{k-2}$=1) In the table, the subscripts j and m of "$Z_{jm}$" represent phase differences of "$R_{k-2}-R_{k-1}$" and "$R_{k-1}-R_k$". (When "$Z_{jm}$" corresponds to "−1", there is a phase difference, whereas when it corresponds to "1", there is no phase difference).

Now, a method for determining symbols will be described in conjunction with FIG. 4.

First, a sequential delay of an input symbol is carried out, thereby generating a plurality of symbols (in FIG. 4, three symbols). Thereafter, combinations of the symbols are determined. A complex conjugate is then taken from each symbol combination. The taken complex conjugate is then multiplied by a preceding one of the associated, combined symbols, thereby deriving a phase difference between the combined symbols. In the case of FIG. 4, "$R_{k-1} R^*_{k-2}$" and "$R_k R^*_{k-1}$" are derived. The real number of the product resulting from the multiplication of the complex conjugate is maximized when the associated symbols have the same phase or different phases, respectively. When two combined symbols have the same phase, the phase difference between the symbols is multiplied by a value of "1". On the other hand, when two combined symbols have different phases, the phase difference between the symbols is multiplied by a value of "−1". The resultant values are then added to each other. In the case of FIG. 4, four phase difference combinations are given. After deriving these four values $Z_{00}$, $Z_{01}$, $Z_{10}$, and $Z_{11}$, the maximum one of the derived values is determined For instance, when it is determined that "$Z_{01}$" is maximum, as in the case of FIG. 4, "$R_{k-2}-R_{k-1}$" involves no phase variation whereas "$R_{k-1}-R_k$" involves a phase variation. Accordingly, when "$R_{k-2}$ corresponds to "+1", "$R_{k-1}$" corresponds to "+1" while "$R_k$" corresponds to "−1". In accordance with the present invention first of all, it is assumed that the first chip of a PN code to be derived corresponds to "+1". Under this assumption, n−1 PN chips are determined, thereby deriving n chips.

The above procedure is repeated M times (corresponding to a window size), thereby deriving average values or representative values of n chips. Thus, the n chips are derived.

Based on these n chips, seed values of the PN code generator, which has generated a PN code associated with the chips, can be determined.

An algorithm for determining such seed values will now be described in conjunction with an IS-95 system.

The PN code generator of the IS-95 cellular system uses th following generating polynomial:

$$P(x) = X^{15} + X^{13} + X^9 + X^8 + X^7 + X^5 + 1$$

Figure 5:
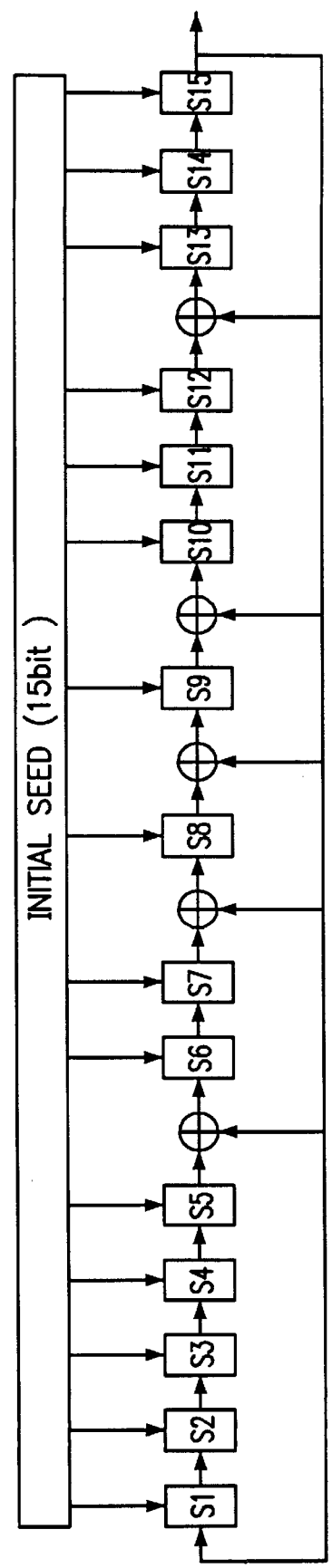
FIG. 5 is a diagram illustrating the hardware configuration of a PN code generator.

FIG. 5 shows a hardware configuration of the PN code generator. Since the PN code generator has a PN code length of $2^{15}-1$, 15 delays are used as shown in FIG. 5. In FIG. 5, "S" represents a seed value (S=(S(1), S(2), ... S(15)). "R" represents a PN code output generated from a seed S (R=R(1) a R(2), ...,R(15)). The PN code output R (R=R(1), R(2), ... R(15)) can be expressed by the functions of S (S=S(1), S(2), ... S(15)) and R as follows:

R(15) = S(15)
R(14) = S(14)
R(13) = S(13) ⊕R(15)
R(12) = S(12) ⊕R(14)

-continued

R(11) = S(11) ⊕R(13)
R(10) = S(10) ⊕R(12)
R(9) = S(9) ⊕R(15) ⊕R(11)
R(8) = S(8) ⊕R(15) ⊕R(14) ⊕R(10)
R(7) = S(7) ⊕R(15) ⊕R(14) ⊕R(13) ⊕R(9)
R(6) = S(6) ⊕R(14) ⊕R(13) ⊕R(12) ⊕R(8)
R(5) = S(5) ⊕R(15) ⊕R(13) ⊕R(12) ⊕R(11) ⊕R(7)
R(4) = S(4) ⊕R(14) ⊕R(12) ⊕R(11) ⊕R(10) ⊕R(6)
R(3) = S(3) ⊕R(13) ⊕R(11) ⊕R(10) ⊕R(9) ⊕R(5)
R(2) = S(2) ⊕R(12) ⊕R(10) ⊕R(9) ⊕R(8) ⊕R(4)
R(1) = S(1) ⊕R(11) ⊕R(9) ⊕R(8) ⊕R(7) ⊕R(3)

Based on the above 15 equations, the seed S (S=S(1), S(2), ..., S(15)) can be expressed by the function of only R (R=R(1), R(2), ..., R(15)) as follows:

S(15) = R(15)
S(14) = R(14)
S(13) = R(13) ⊕R(15)
S(12) = R(12) ⊕R(14)
S(11) = R(11) ⊕R(13)
S(10) = R(10) ⊕R(12)
S(9) = R(9) ⊕R(11) ⊕R(15)
S(8) = R(8) ⊕R(10) ⊕R(14) ⊕R(15)
S(7) = R(7) ⊕R(9) ⊕R(13) ⊕R(14) ⊕R(15)
S(6) = R(6) ⊕R(8) ⊕R(12) ⊕R(13) ⊕R(14)
S(5) = R(5) ⊕R(7) ⊕R(11) ⊕R(12) ⊕R(13) ⊕R(15)
S(4) = R(4) ⊕R(6) ⊕R(10) ⊕R(11) ⊕R(12) ⊕R(14)
S(3) = R(3) ⊕R(5) ⊕R(9) ⊕R(10) ⊕R(11) ⊕R(13)
S(2) = R(2) ⊕R(4) ⊕R(8) ⊕R(9) ⊕R(10) ⊕R(12)
S(1) = R(1) ⊕R(3) ⊕R(7) ⊕R(8) ⊕R(9) ⊕R(11)

Using the above equations, it is possible to determine the seed from the output R (R=R(1), R(2), ..., R(15)) of the PN code generator. That is, the seed of the PN code generator can be determined, based on the received PN code. Although the above equations are induced in conjunction with the PN code generator of the IS-95 system, equations of other PN code generators may be induced in a similar manner.

When the determined seed is loaded in the PN cod generator, a PN code having the same offset as that of th received PN code is generated from the PN code generator.

In the present invention, it is important to accurately determine n PN codes from $2^n-1$ PN codes. The above-mentioned algorithm ensures more or less a reliability by receiving a PN code M times (corresponding to the window size), and then calculating phase differences based on the first PN code. However, when an one of n PN codes involves an error, the seed determination may be erroneous due to the error. As a result, a false alarm state may be generated. In this case, the acquisition time for the initial synchronization may be lengthened.

Figure 6:
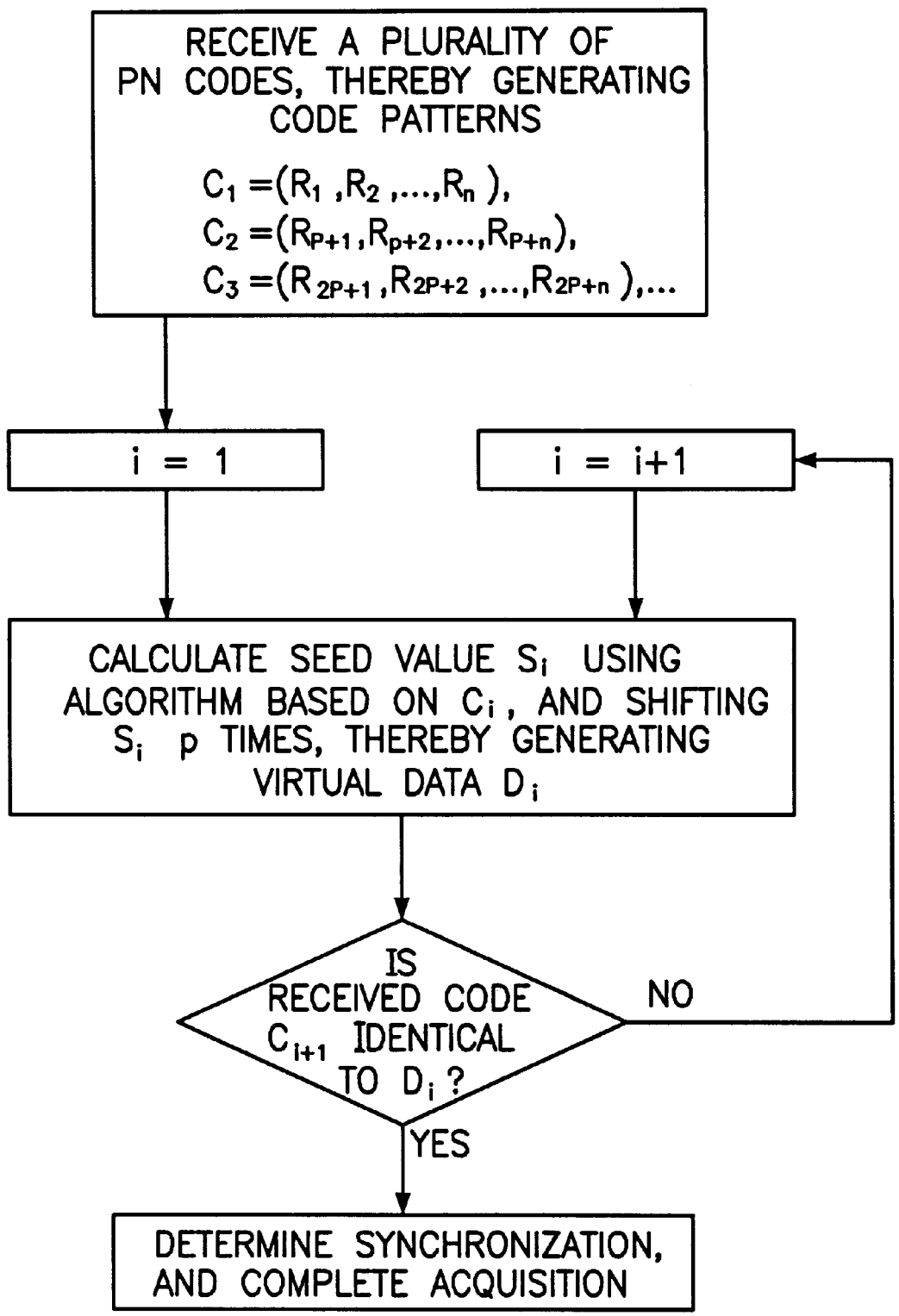
FIG. 6 is a flow chart of a verification algorithm according to the present invention.
Figure 7:
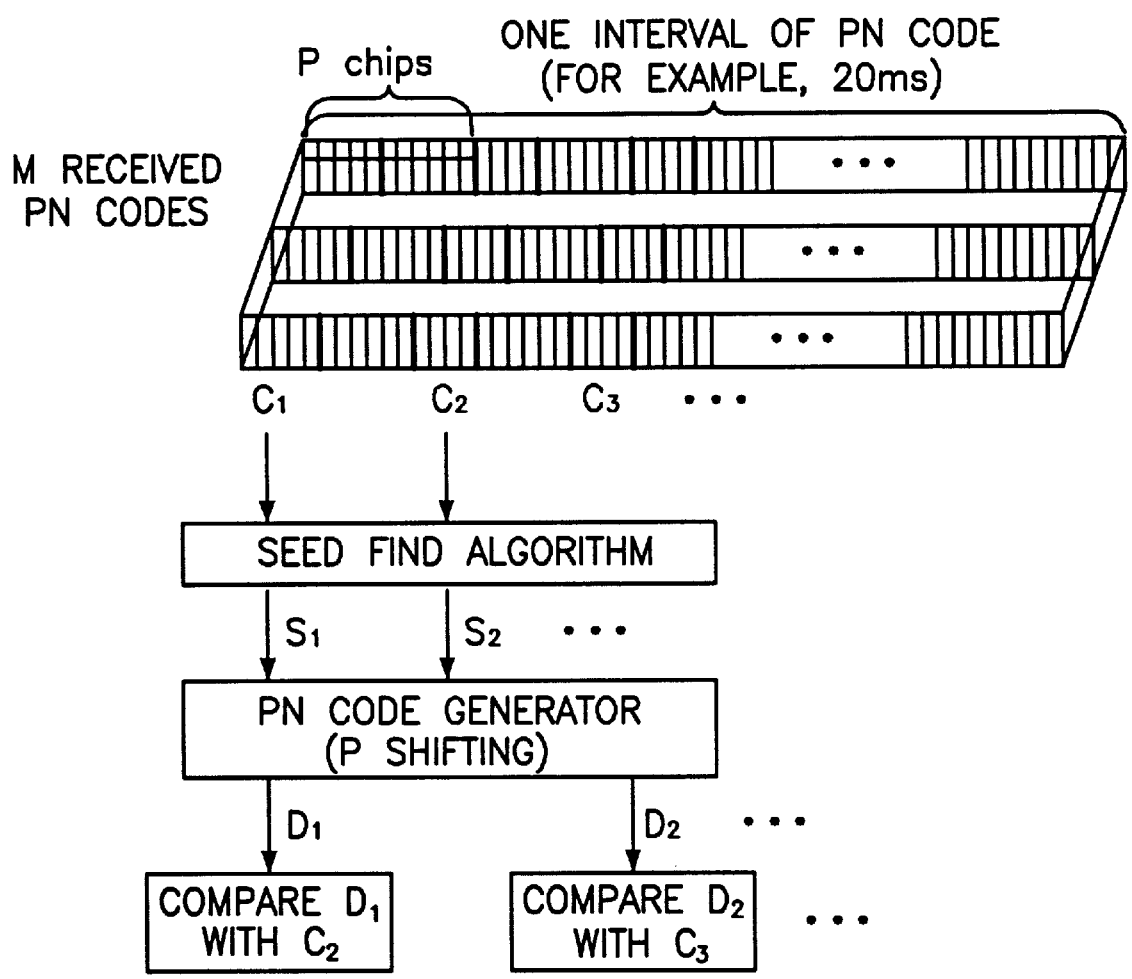
FIG. 7 is a diagram schematically illustrating the flow of the verification algorithm according to the present invention.

In order to solve such a problem, the present invention proposes a verification algorithm. FIG. 6 illustrates a flow chart of the verification algorithm. FIG. 7 is a diagram schematically illustrating the flow of the verification algorithm. In accordance with the algorithm shown in FIG. 6, a plurality of PN codes are received to calculate phase differences as mentioned above. Base on the calculated phase differences, a plurality of code patterns C1, C2, C3, ... having an interval P in every code pattern are generated. Thereafter, a seed S1 is determined, based on the code pattern C1. The seed S1 is shifted P times (for P clocks), thereby generating virtual data D1. The reason why the seed S1 is shifted P times is that the position of the code pattern C2 is spaced apart from the position of the code pattern C1 by "P". Where the seed S1 determined on the basis of the code pattern C1 is accurate, the probability that the virtual data D1 obtained after shifting the code pattern C1 by "P" is identical to the code pattern C2 is high. Accordingly, it is possible to indirectly verify whether the seed is accurately determined or not. If the virtual data D1 is different from the code pattern C2, the above procedure is then executed again for subsequently received code patterns. Where the virtual data is identical to the code pattern, it is regarded that a code synchronization is obtained. In this case, a synchronization tracking procedure begins after completing the initial synchronization procedure. The verification procedure may be repeated several times in accordance with the channel state. In this case, it is possible to reduce the generation rate of a false alarm, thereby reducing the entire acquisition time for the initial synchronization. There is no problem caused by the repeated verification.

As apparent from the above description, the present invention provides an effect capable of rapidly obtaining an initial synchronization as compared to conventional serial search methods Actually, the initial synchronization speed in the present invention is higher than those of the conventional serial search methods b the following times:

$$\text{Long PN Code Sequence Length}/(Ts \times \text{PN Code Chip Rat}) \quad (3)$$

(In this case, the same window size is used, and the long PN code sequence length is "$2^n-1$" whereas "Ts" is PN code period, 20 ms).

Since a rapid initial synchronization is obtained in accordance with the present invention, it is possible to reduce the time taken for the initial synchronization within several seconds.

In addition, the initial synchronization method of the present invention involves an initial synchronization verification procedure. Accordingly, it is possible to obtain an accurate initial synchronization.

What is claimed is:

1. An initial synchronization method in a code division multiple access reception system for determining a pseudonoise (PN) code received in the system by receiving a signal corresponding to an interval of the PN code including a desired number of chips by the number of reception times corresponding to a window size, determining representative values of corresponding ones of the chips in the window, respectively, and determining the representative values as chips of the PN code, comprising the steps of:

selecting a first plurality of n successive PN code chips having the same offset in each interval of the PN code;

deriving a second plurality of m (where m<n) phase differences of the successive PN code chips in each interval of the PN code, and continuously deriving subsequent PN code chips, thereby deriving n PN code chips; and deriving representative values of n chips of the PN code, based on corresponding ones of the PN code chips derived in all intervals of the PN code, respectively, thereby determining the PN code.

2. The initial synchronization method in accordance with claim 1, wherein the interval of the PN code is variable.

3. The initial synchronization method in accordance with claim 1, wherein the window size is variable.

4. The initial synchronization method in accordance with claim 1, wherein the PN code has an entire interval of $2^n-1$.

5. The initial synchronization method in accordance with claim 1, wherein "m" corresponds to 2.

6. The initial synchronization method in accordance with claim 1, wherein "m" corresponds to 3.

7. The initial synchronization method in accordance with claim 1, wherein "m" is more than 3.

8. The initial synchronization method in accordance with claim 1, wherein the step of deriving representative values of PN code chips comprises the steps of averaging corresponding ones of PN code chips in all intervals of the PN code in terms of offsets, respectively, and determining the average values as chips of the PN code respectively corresponding to the offsets.

9. The initial synchronization method in accordance with claim 1, wherein the step of deriving representative values of PN code chips comprises the steps of determining values dominantly existing in terms of offsets, respectively, and determining the determined values as chips of the PN code, respectively.

10. An initial synchronization method in a code division multiple access reception system for determining a PN code received in the system by receiving a signal corresponding to an interval of the PN code including a desired number of chips by the number of reception times corresponding to a window size, determining representative values of corresponding ones of the chips in the window, respectively, determining the representative values as a signal indicative of chips of the PN code, and comparing the signal with a subsequent signal, comprising the steps of:

selecting a first plurality of n successive PN code chips having the same offset in each interval of the PN code;

deriving a second plurality of m (where m<n) phase differences of the successive PN code chips in each interval of the PN code, and continously deriving subsequent PN code chips, thereby deriving n PN code chips; and deriving representative values of n chips of the PN code, based on corresponding ones of the PN code chips derived in all intervals of the PN code, respectively, thereby determining the signal indicative of the derived representative values as a first PN code signal;

shifting offset an integer number, p, of times in each interval of the PN code, and then repeating the above steps, thereby deriving a second PN code signal;

deriving a seed, from which the PN code has been generated, based on the first PN code signal, using a generating polynomial of a PN code generator included in the system; and inputting the seed at the PN code generator, shifting the seed by p clocks, and determining a synchronization when a signal generated after the seed shifting is identical to the second PN code signal while determining an asynchronization when the signal generated after the seed shifting is different from the second PN code signal.

* * * * *